United States Patent
Barbotin et al.

(10) Patent No.: US 6,949,489 B1
(45) Date of Patent: Sep. 27, 2005

(54) SOLID SUPPORTED CATALYST USABLE FOR THE POLYMERIZATION OF CONJUGATED DIENES, PROCESS FOR THE PREPARATION THEREOF AND A PROCESS FOR THE POLYMERIZATION OF CONJUGATED DIENES USING THIS CATALYST

(75) Inventors: Fanny Barbotin, Cleremont-Ferrand (FR); Christophe Boisson, Villeurbanne (FR); Roger Spitz, Lyons (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 721 days.

(21) Appl. No.: 09/688,376

(22) Filed: Oct. 11, 2000

(30) Foreign Application Priority Data

Oct. 11, 1999 (FR) .................................. 99/12744

(51) Int. Cl.⁷ .......................... B01J 31/00; B01J 37/00; C08F 4/02; C08F 4/60
(52) U.S. Cl. ...................... 502/154; 502/102; 502/104; 502/110; 502/152
(58) Field of Search ........................ 502/102, 110, 104, 502/152, 154

(56) References Cited

U.S. PATENT DOCUMENTS

| | | | |
|---|---|---|---|
| 5,478,901 A | 12/1995 | Jones et al. | |
| 5,633,353 A | 5/1997 | Garbassi et al. | |
| 5,728,816 A | 3/1998 | Garbassi et al. | |
| 5,821,189 A * | 10/1998 | Calderazzo et al. | 502/152 |

FOREIGN PATENT DOCUMENTS

| | | |
|---|---|---|
| EP | 0637589 A1 | 2/1995 |
| EP | 0856530 A2 | 8/1998 |
| EP | 0856530 A3 | 9/1998 |
| EP | 0637589 B1 | 11/1998 |
| WO | 9217510 | 10/1992 |

OTHER PUBLICATIONS

B. Fan et al., J. Organomet. Chem., vol. 376, pp. 61-66 (1989).*

B. Fan et al., J. Organomet. Chem., vol. 377, pp. 51-58 (1989).*

Hu Jing-Yu et al.: "Study on the Polymerization of Isoprene Catalyzed by Neutral Arene Organolanthanoids-Air$_3$ System" Chinese Science Bulletin (vol. 37, No. 7) (Apr. 1992), pp. 566-570.

Hongze Liang et al.: "A New Method for the synthesis of Ln($\eta^6$-C$_6$Me$_6$) (AlCl$_4$)$_3$(Ln=Nd, Sm, Gd, Yb), and the X-ray crystal structure of Yb($\eta^6$-C$_6$Me$_6$) (AlCl$_4$)$_3$-MeC$_6$H$_5$)" Journal of Organometallic Chemistry 474 (1994) pp. 113-116.

Paolo Biagini et al.: Alkylation of lanthanide ($\eta^6$-arene)-tetrahalogenoaluminates: Synthesis and catalytic activity of Ln ($\eta^6$-arene) (AlX$_3$R)$_3$derivatives. Molecular structure of Nd($\eta^6$-C$_6$H$_5$Me) (AlCl$_3$ME), New J. Chem., 1995, 19, pp. 713-722.

* cited by examiner

Primary Examiner—J. A. Lorengo
Assistant Examiner—J. Pasterczyk
(74) Attorney, Agent, or Firm—Burns, Doane, Swecker & Mathis, LLP

(57) ABSTRACT

The present invention relates to a solid supported catalyst usable for the polymerization of conjugated dienes, to a process for the preparation of said catalyst and to a process for the polymerization of conjugated dienes using said catalyst. The solid supported catalyst according to the invention comprises the reaction product of a) a complex represented by formula $M(Ar)(AlX_4)_3$, where M is a rare earth metal selected from among the metals having an atomic number of from 57 to 71, inclusive in Mendeleyev's periodic table of elements, Ar is an aromatic hydrocarbon solvent, Al is aluminum and X is selected from the group consisting of fluorine, chlorine, bromine and iodine, and b) a solid support comprising at least one inorganic metal oxide compound. The invention also provides a polymerization process for conjugated dienes in an inert hydrocarbon solvent in which the said catalyst is used to polymerize the conjugated dienes in the presence of an activator compound comprising a trialkylaluminum or dialkylaluminum hydride.

21 Claims, No Drawings

SOLID SUPPORTED CATALYST USABLE FOR THE POLYMERIZATION OF CONJUGATED DIENES, PROCESS FOR THE PREPARATION THEREOF AND A PROCESS FOR THE POLYMERIZATION OF CONJUGATED DIENES USING THIS CATALYST

BACKGROUND OF INVENTION

The present invention relates to a solid supported catalyst usable for the polymerization of conjugated dienes, to a process for the preparation of said catalyst and to a process for the polymerization of conjugated dienes using said catalyst. The present invention applies, for example, to a catalyst comprising a solid, silica-based support.

The person skilled in the art is thoroughly familiar with the use of rare earth compounds for the preparation of catalysts intended for polymerizing conjugated dienes. An essential condition for satisfactory activity of the resultant catalyst is that the rare earth compound be sufficiently well dispersed in the polymerization solvent.

European patent EP-A-856 530 discloses the use of organic rare earth derivatives for preparing a solid supported catalyst. These organic derivatives are known to be soluble in hydrocarbon polymerization solvents and, consequently, provide a good dispersion of the corresponding rare earth in the solvent.

The catalyst described in said document is prepared by reacting a solid, silica-based inorganic support in such a solvent
  on the one hand, with an alkylaluminum chloride, then with a solution comprising an organic rare earth derivative, such as a neodymium carboxylate or,
  on the other hand, with a co-catalyst consisting of an alkylaluminum or an alkylaluminum hydride.

One major disadvantage of this catalyst is the necessity of previously synthesising the organic rare earth derivative for the purpose of preparing said catalyst.

European patent EP-A-637 589 describes homogeneous, i.e. unsupported, catalysts based on a rare earth halide which are usable for polymerizing conjugated dienes. These catalysts are of the formula $M(Ar)(AlX_3R)_3$ and are prepared by reacting exactly 1.5 equivalents of a trialkylaluminum with a complex of the formula $M(Ar)(AlX_4)_3$ (in these formulae, M is a rare earth such as neodymium, Ar is an aromatic hydrocarbon solvent, such as toluene, Al an atom of aluminum and X a halogen).

Reference may be made to the article by H. Liang, Q. Shen, J. Guan et Y. Lin, Journal of Organometallic Chemistry, 474 (1994), pp. 113–116, for details of the method for preparing such a complex of the formula $M(Ar)(AlX_4)_3$.

One major disadvantage of this homogeneous catalyst is that the activity thereof is very highly dependent upon the aluminum: rare earth ratio.

Thus, in the presence of a large excess of trialkylaluminum, the homogeneous catalyst of the above formula $M(Ar)(AlX_3R)_3$ is not obtained, but rather a complex of the formula $M(Ar)(AlX_4)_3$ is obtained, which dissociates to form a rare earth trihalide of the formula $MX_3$ (c.f article in New. J. Chem. (1995) 19, pp. 713–722).

Following the example of EP-A-637 589, the article of Hu Jing-Yu, Tian He-Qin, Shen Qi, et Liang Hong-Ze, Chinese Science Bulletin, Vol. 37, no. 7, pp. 566–570 (1992) describes a homogeneous catalyst for polymerizing isoprene. This unsupported catalyst is obtained by reacting a complex of the formula $Nd(C_6H_6)(AlCl_4)_3$ with a trialkylaluminum (where Nd is neodymium and $C_6H_6$ is benzene).

This catalyst differs from that described in EP-A-637 589 by the possibility of using aluminum:neodymium ratios which may reach higher values, such as 30 or 40, in order to obtain a catalyst having satisfactory catalytic activity during the isoprene polymerization reaction.

However, one major disadvantage of this homogeneous catalyst resides in reduced viscosity values and the level of cis-1,4 linkages which it brings about in the resultant polyisoprenes.

The object of the present invention is to overcome these disadvantages.

SUMMARY OF THE INVENTION

The present invention provides a solid supported catalyst, usable for polymerizing conjugated dienes, comprising the reaction product of
  a. a complex represented by the formula $M(Ar)(AlX_4)_3$, where M is a rare earth metal selected from among the metals having an atomic number of between 57 and 71 in Mendeleyev's periodic table of elements, where Ar is an aromatic hydrocarbon solvent, where Al is aluminum and where X is a halogen atom selected from among fluorine, chlorine, bromine and iodine, and
  b. a solid support comprising at least one inorganic metal oxide compound.

Also provided are methods for preparing the solid supported catalyst and using the catalyst for polymerizing conjugated dienes.

DETAILED DESCRIPTION OF THE INVENTION

In a first exemplary embodiment, the catalyst of the invention is prepared in three stages:

(1) In a first stage, the solid support comprising at least one inorganic metal oxide compound is prepared.

This support is such that it comprises, as inorganic metal oxide compound, at least one porous solid compound, for example based on silica or based on other porous compounds conventionally used for catalysis by those skilled in the art, such as magnesium oxide or alumina.

This solid support may also comprise a mixture of these porous inorganic compounds.

The inorganic metal oxide compound used is preferably a silica having a specific surface area substantially between 200 and 360 $m^2/g$.

This solid support may be obtained solely by dehydration followed, in certain cases, by partial dehydroxylation by heat treatment under a vacuum of the inorganic metal oxide compound or compounds. The temperature of this optional heat treatment is between about 100° C. and 1000° C. and, advantageously, between 300° C. and 800° C.

The solid support is preferably obtained by reacting the metal oxide compound or compounds treated in this manner with a Lewis acid of the formula $M'X_n$, where n is an integer ranging from 3 to 5, where X represents a halogen atom, selected from among fluorine, chlorine, bromine and iodine and where M' is a metal, the atomic number Z of which complies with either of the following two conditions:

Z $\in \{5; 13; 22; 26; 40; 50; 51; 72\}$, or

Z ranging from 57 to 71.

Still more preferably, M' is selected from among boron, titanium, iron, aluminum, zirconium, tin, hafnium and antimony.

The reaction with said Lewis acid may be performed in accordance with two methods, either of which may be used.

According to the first method, this reaction is performed with the pure Lewis acid, if said acid is in the liquid state, or alternatively with the Lewis acid dissolved in an inert hydrocarbon solvent, if said acid is not in the liquid state. This inert solvent may be aliphatic or aromatic and preferably comprises toluene.

In either case, with regard to the state of the Lewis acid which is used, the reaction is performed at a temperature of between 20° C. and 100° C. for a period which may vary between a few minutes and several hours, depending upon the Lewis acid and the inorganic metal oxide compound or compounds which are used.

The solid support which has been modified by this reaction is then washed and, optionally, dried under a vacuum.

According to the second method which is particularly appropriate when the Lewis acid is in the solid state, said reaction is performed with an excess of said Lewis acid, then this latter compound is sublimed at atmospheric pressure.

(2) In a second stage, the complex of the formula $M(Ar)(AlX_4)_3$ is prepared in a preformed manner.

This complex is obtained by the reaction, in said solvent Ar, of a halide of said rare earth metal M, represented by the formula $MX_3$, and an aluminum halide, represented by the formula $AlX_3$, where X represents an atom of the same halogen as before.

Benzene and toluene are preferably used as solvent Ar.

Preferably, said rare earth metal M is neodymium and the corresponding halide is neodymium trichloride.

This reaction between the aluminum halide $AlX_3$ and the rare earth metal halide $MX_3$ is performed in such a manner that the molar ratio $AlX_3:MX_3$ is greater than or equal to 3. This ratio is advantageously between 4 and 7.

This reaction is moreover preferably performed at a temperature of between 50° C. and 100° C., advantageously at around 80° C., for a reaction time which is between a few minutes and several hours. Advantageously the reaction time is about 3 hours.

This stated reaction gives rise to a solution comprising the $M(Ar)(AlX_4)_3$ complex and, optionally, free aluminum halide, in the event that said molar ratio $AlX_3:MX_3$ is greater than 3.

(3) In a third stage, the solution containing the complex of formula $M(Ar)(AlX_4)_3$ is reacted with the solid support, whether or not the latter has been modified with the Lewis acid, to obtain a catalyst according to the present invention.

Specifically, this latter reaction is performed at a temperature which is preferably below 90° C., for a period which may vary between a few minutes and several hours. This period is a function of the complex and support used and is preferably less than 4 hours.

The resultant product is then washed with an inert hydrocarbon solvent in order to obtain said catalyst.

According to a second exemplary embodiment, the catalyst is prepared in the following manner:

(1) In accordance with one method of this second embodiment, a solid support comprising at least one inorganic metal oxide compound which has been dehydrated and, optionally, dehydroxylated is reacted in an aromatic hydrocarbon solvent Ar with a considerable excess of Lewis acid comprising an aluminum halide of the formula $AlX_3$.

Reference may be made to the second stage of the first exemplary embodiment regarding the definition of the reactants used (the atomic number Z of the metal M' of this Lewis acid is selected at 13 for this second example).

Once the solid support and the aluminum halide have reacted with each other in suspension in said solvent, a rare earth halide $MX_3$ is added thereto (where M is a rare earth metal selected from the metals having an atomic number of between 57 and 71 in Mendeleyev's periodic table of elements and where X is an atom of the same halogen as that of said aluminum halide $AlX_3$), in order to achieve in situ formation of the complex of formula $M(Ar)(AlX_4)_3$.

The formation reaction for this complex is performed at a temperature which may vary widely and which is preferably about 90 C. The duration of the reaction between said solid support and the aluminum halide $AlX_3$ may vary between a few minutes and several hours and, preferably, is about 90 minutes.

The product arising from the reaction of said complex and said solid support is then washed with an inert hydrocarbon solvent, then this solid product is dried under a vacuum.

Any excess aluminum halide present in this solid product is optionally sublimed under a vacuum.

(2) A second method of implementing this second embodiment differs from the first method above in that said solid support is simultaneously reacted, in the aromatic hydrocarbon solvent Ar, with a considerable excess of the aluminum halide $AlX_3$ and with the rare earth halide $MX_3$, in order to achieve in situ formation of the complex $M(Ar)(AlX_4)_3$.

As in the first method, the product arising from the reaction between the complex and the solid support is then washed with an inert hydrocarbon solvent, then this solid product is dried under a vacuum. This reaction may also be performed with or without sublimation of the aluminum halide $AlX_3$.

According to a third exemplary embodiment, the catalyst is prepared in the following manner:

The catalyst obtained according to the above first or second exemplary embodiment (the complex being prepared in a preformed or in situ manner, respectively) is reacted with a compound represented by the formula $AlX_nR_{3-n}$, where Al is an aluminum atom, X is a halogen atom, which may be fluorine, chlorine, bromine or iodine, R is a hydrogen atom or an alkyl group having from 1 to 15 carbon atoms and n is an integer which may range from 0 to 3.

Preferred compounds $AlX_nR_{3-n}$ include triethylaluminum and triisobutylaluminum (for both, n equals 0) and diethylaluminum chloride (n equals 1).

The reaction with the compound $AlX_nR_{3-n}$ is performed for a period which may range from a few minutes to several hours.

The catalyst modified in this manner is then washed with an inert hydrocarbon solvent, then the modified and washed catalyst is dried under a vacuum.

It should be noted that the molar ratio between the quantity of the compound $AlX_nR_{3-n}$ used as a reactant and the quantity of rare earth metal used to obtain the above-stated complex must be above 1.5 and may vary considerably.

A process according to the invention for the polymerization of conjugated dienes comprises reacting, in an inert hydrocarbon solvent, at least one conjugated diene monomer with said solid supported catalyst according to the invention in the presence of an activator compound comprising a trialkylaluminum or dialkylaluminum hydride.

Conjugated diene monomers which may be used in the polymerization process of the invention include, 1,3-butadiene and/or isoprene.

This polymerization reaction is preferably performed at a temperature of between about 40° C. and 120° C. and, still more preferably, at a temperature of around 70° C.

The above-stated, and further, features of the present invention are disclosed in greater detail in the following description of several exemplary embodiments of the invention, which are stated by way of illustrative, non-limiting examples.

All the Examples according to the invention were performed under argon and the solvents used had previously been dried with a 3 Å molecular sieve under a stream of argon. Intrinsic viscosities were furthermore determined at 25° C. in toluene at a concentration of 0.1 g/dl.

The rare earths used for the preparation of the various catalysts in these Examples are neodymium for Examples 1 to 10 and praseodymium for Example 12.

The solid supports used in the following Examples are respectively:

in Examples 1 to 10 and in Example 12, an inorganic metal oxide compound comprising a silica having a BET specific surface area of between 280 and 355 m$^2$/g, which is commercially available from GRACE DAVISON under the name "SILICA I 332" and which is treated in the following manner.

5 g of silica "I 332" are subjected to heat treatment under a vacuum which comprises a successive increase in temperature from 20° C. to 100° C. in thirty minutes, from 100° C. to 130° C. in thirty minutes, from 130° C. to 450° C. in one hour, an isothermal of 4 hours at 450° C. and a return to ambient temperature. After this treatment, the hydroxyl group content on the surface of the silica is 1.4 mmol/g; and in Example 11, an inorganic metal oxide compound comprising silica having a BET specific surface area of between 175 and 225 m$^2$/g, which is commercially available from DEGUSSA under the name "AEROSIL 200" and which is treated in the following manner.

5 g of silica "AEROSIL 200" are subjected to heat treatment under a vacuum which comprises a successive increase in temperature from 20° C. to 100° C. in thirty minutes, from 100° C. to 130° C. in thirty minutes, from 130° C. to 450° C. in one hour, an isothermal of 2 hours at 450° C. and a return to ambient temperature. After this treatment, the hydroxyl group content on the surface of the silica is 0.7 mmol/g.

In the following Examples, the content of cis linkages in the resultant polymers was determined by method using near infrared radiation, except in Example 5 where said content was determined by the $^{13}$C NMR method.

EXAMPLE 1

1) Catalyst Preparation (Complex Formed In Situ):

4.6 g of a Lewis acid comprising anhydrous AlCl$_3$ (aluminum trichloride) and 2.37 g of heat-treated silica "I 332" are stirred together in toluene at a temperature of 80° C. for 1 hour 30 minutes. In this manner, a solid support for the catalyst is obtained.

1.71 g of NdCl$_3$ are then added and the mixture heated to 80° C. for 3 hours. In this manner, an Nd($\eta^6$-C$_6$H$_5$Me)(AlCl$_4$)$_3$ complex is formed in situ, where Me is a methyl group and $\eta^6$-C$_6$H$_5$Me represents toluene, which is used as the solvent Ar.

The resultant catalyst is then washed with toluene and dried under a vacuum. Any excess AlCl$_3$ is then sublimed under a vacuum.

2) Butadiene Polymerization Process:

A suspension comprising 180 ml of heptane, to which 85 mg of the above-prepared catalyst and 3 mmol/l of diisobutylaluminum hydride activator compound have been added, is introduced into a reactor. 30 ml of butadiene are then added and the reactor temperature is adjusted to 70° C. After 60 minutes' reaction time, polymerization is terminated by cooling the reactor and then by precipitating the resultant polymer in methanol.

1.1 g of polybutadiene are obtained having an intrinsic viscosity of 3.12 dl/g and a cis linkage content of slightly above 99%.

EXAMPLE 2

1) Catalyst Preparation (Complex Formed In Situ and Final Addition of a Compound of the Formula AlX$_n$R$_{3-n}$):

1.93 g of a Lewis acid comprising of anhydrous AlCl$_3$ (aluminum trichloride) and 1.71 g of heat-treated silica "I 332" are stirred together in toluene at a temperature of 90° C. for 1 h. In this manner, a solid support for the catalyst is obtained.

0.8 g of NdCl$_3$ is then added and the mixture heated to 90° C. for 3 hours 15 minutes. In this manner, an Nd($\eta^6$-C$_6$H$_5$Me)(AlCl$_4$)$_3$ complex is formed in situ. The resultant solid is then washed with toluene and dried under a vacuum. Any excess AlCl$_3$ is then sublimed under a vacuum at 130° C.

1 g of this solid is then treated in toluene with 10 ml of a molar solution of triethylaluminum (represented by the formula AlX$_n$R$_{3-n}$, where n=0). The resultant catalyst is washed with heptane and dried under a vacuum.

2) Butadiene Polymerization Process:

A comprising 180 ml of heptane, to which 85 mg of the above-prepared catalyst and 3 mmol/l of diisobutylaluminum hydride activator compound have been added, is introduced into a reactor. 30 ml of butadiene are then added and the reactor temperature is adjusted to 70° C. After 30 minutes' reaction time, polymerization is terminated by cooling the reactor and then by precipitating the resultant polymer in methanol.

6.5 g of polybutadiene are obtained having an intrinsic viscosity of 2.28 dl/g and a cis linkage content of slightly above 99%.

EXAMPLE 3

1) Catalyst Preparation (Preformed Complex and Final Addition of a Compound of the Formula AlX$_n$R$_{3-n}$):

Approx. 30 ml of a Lewis acid comprising TiCl$_4$ (titanium tetrachloride) are added to 1 g of heat-treated silica "I 332". The mixture is stirred at a temperature of 80° C. for 1 hour, then the resultant solid is washed with heptane. In this manner, a solid support for the catalyst is obtained.

Independently of the solid support, 1.09 g of anhydrous AlCl$_3$ and 0.41 g of NdCl$_3$ are stirred together in toluene at a temperature of 90° C. for 3 hours. In this manner, a solution comprising an Nd($\eta^6$-C$_6$H$_5$Me)(AlCl$_4$)$_3$ complex is obtained.

The solid support is then reacted with the complex for 1 hour at 90° C. The resultant solid is washed with toluene and then dried under a vacuum.

0.57 g of the solid obtained in this manner is then reacted when cold with 8 ml of a molar solution of triethylaluminum. The catalyst obtained in this manner is then washed with heptane and dried under a vacuum.

2) Butadiene Polymerization Process:

A suspension comprising 180 ml of heptane, to which 83 mg of the above-prepared catalyst and 3 mmol/l of diisobutylaluminum hydride activator compound have been added, is introduced into a reactor. 30 ml of butadiene are then added and the reactor temperature is adjusted to 70° C. After 15 minutes' reaction time, polymerization is terminated by cooling the reactor and then by precipitating the resultant polymer in methanol.

11.1 g of polybutadiene are obtained having an intrinsic viscosity of 2.20 dl/g and a cis linkage content of slightly above 99%.

EXAMPLE 4

1) Catalyst Preparation (Preformed Complex and Final Addition of a Compound of the Formula $AlX_nR_{3-n}$):

A mixture of heat-treated silica "I 332" and 1.21 g of a Lewis acid comprising $ZrCl_4$ (zirconium tetrachloride) is placed in an oven. The $ZrCl_4$ is sublimed under atmospheric pressure at a temperature of 300° C. for 30 minutes. In this manner, a solid support for the catalyst is obtained.

Independently of the solid support, 0.73 g of anhydrous $AlCl_3$ and 0.36 g of $NdCl_3$ are stirred together in toluene at a temperature of 90° C. for 3 hours. In this manner, a solution comprising an $Nd(\eta^6-C_6H_5Me)(AlCl_4)_3$ complex is obtained.

0.9 g of the solid support is then reacted with the complex for 16 hours 30 minutes at 80° C. The resultant solid is washed with toluene and then dried under a vacuum.

The solid obtained in this manner is then reacted with 10 ml of a molar solution of triethylaluminum. The catalyst obtained in this manner is then washed with heptane and dried under a vacuum.

2) Butadiene Polymerization Process:

A suspension comprising 180 ml of heptane, to which 71 mg of the above-prepared catalyst and 3 mmol/l of diisobutylaluminum hydride activator compound have been added, is introduced into a reactor. 30 ml of butadiene are then added and the reactor temperature is adjusted to 70° C. After 60 minutes' reaction time, polymerization is terminated by cooling the reactor and then by precipitating the resultant polymer in methanol.

0.8 g of polybutadiene are obtained having an intrinsic viscosity of 2.25 dl/g and a cis linkage content of slightly above 99%.

EXAMPLE 5

1) Catalyst Preparation (with a Preformed Complex and Final Addition of a Compound of the Formula $AlX_nR_{3-n}$):

11 ml of a molar solution of a Lewis acid comprising $BCl_3$ (boron trichloride) in heptane are added to 1.7 g of heat-treated silica "I 332" which has been placed in heptane. The mixture is stirred at a temperature of 70° C. for 2 hours 20 minutes, then the resultant solid is washed with heptane. In this manner, a solid support for the catalyst is obtained.

Independently of the solid support, 1.76 g of anhydrous $AlCl_3$ and 0.68 g of $NdCl_3$ are stirred together in toluene at a temperature of 90° C. for 3 hours. In this manner, a solution comprising an $Nd(\eta^6-C_6H Me)(AlCl_4)_3$ complex is obtained.

The solid support is then reacted with the complex for 3 hours at 90° C. The resultant solid is washed with toluene and then dried under a vacuum.

The solid obtained in this manner is then reacted with 10 ml of a molar solution of triethylaluminum. The catalyst obtained in this manner is then washed with heptane and dried under a vacuum.

2) Butadiene Polymerization Process:

A suspension comprising 180 ml of heptane, to which 35 mg of the above-prepared catalyst and 3 mmol/l of diisobutylaluminum hydride activator compound have been added, is introduced into a reactor. 30 ml of butadiene are then added and the reactor temperature is adjusted to 70° C. After 15 minutes' reaction time, polymerization is terminated by cooling the reactor and then by precipitating the resultant polymer in methanol.

10.4 g of polybutadiene are obtained having an intrinsic viscosity of 2.15 dl/g and a cis linkage content of slightly above 99%.

3) Isoprene Polymerization Process:

A mixture comprising 116 ml of cyclohexane, 35 mg of the above-prepared catalyst, 3 mmol/l of diisobutylaluminum hydride activator compound and 14.7 ml of isoprene is introduced into a reactor. The reactor temperature is adjusted to 60° C. After 20 hours' reaction time, polymerization is terminated by adding methanol. The resultant polyisoprene is stabilised and dried under a vacuum.

8.9 g of polyisoprene are obtained having an intrinsic viscosity of 6.5 dl/g and a cis linkage content of 95.8%.

According to one variant of this process, 30 mg of the catalyst are introduced into the reactor instead of 35 mg, with the other reaction conditions being unchanged, including the reactor temperature. After 1 hour's reaction (instead of the above-stated 20 hours), polymerization is terminated by adding methanol, then the resultant polyisoprene is stabilised and dried under a vacuum.

2.8 g of polyisoprene are now obtained having an intrinsic viscosity of 4 dl/g and a cis linkage content of 96.1%.

EXAMPLE 6

1) Catalyst Preparation (Preformed Complex and Final Addition of a Compound of the Formula $AlX_nR_{3-n}$):

1.2 ml of a Lewis acid comprising $SnCl_4$ (tin tetrachloride) are added to 1.5 g of heat-treated silica "I 332" which has been placed in toluene. The mixture is stirred at a temperature of 100° C. for 5 hours, then the resultant solid is washed with toluene. In this manner, a solid support for the catalyst is obtained.

Independently of the solid support, 1.9 g of anhydrous $AlCl_3$ and 0.68 g of $NdCl_3$ are stirred together in toluene at a temperature of 90° C. for 3 hours. In this manner, a solution comprising an $Nd(\eta^6-C_6H_5Me)(AlCl_4)_3$ complex is obtained.

The solid support is then reacted with the complex for 3 hours at 90° C. The resultant solid is washed with toluene and then dried under a vacuum.

The solid obtained in this manner is then reacted with 10 ml of a molar solution of triethylaluminum. The catalyst obtained in this manner is then washed with heptane and dried under a vacuum.

2) Butadiene Polymerization Process:

A suspension comprising 180 ml of heptane, to which 77 mg of the above-prepared catalyst and 3 mmol/l of diisobutylaluminum hydride activator compound have been added, is introduced into a reactor. 30 ml of butadiene are then added and the reactor temperature is adjusted to 70° C. After 15 minutes' reaction time, polymerization is terminated by cooling the reactor and then by precipitating the resultant polymer in methanol.

9.5 g of polybutadiene are obtained having an intrinsic viscosity of 5.22 dl/g and a cis linkage content of slightly above 99%.

EXAMPLE 7

1) Catalyst Preparation (Complex Formed In Situ and Final Addition of a Compound of the Formula $AlX_nR_{3-n}$):

3.24 g of a Lewis acid comprising anhydrous $AlCl_3$ and 1.81 g of heat-treated silica "I 332" are stirred together in toluene at a temperature of 80° C. for 2 hours 30 minutes. In this manner, a solid support for the catalyst is obtained.

1.44 g of $NdCl_3$ are then added and the mixture heated to 80° C. for 3 hours. In this manner, an $Nd(\eta^6\text{-}C_6H_5Me)(AlCl_4)_3$ complex is formed in situ. The resultant solid is then washed with toluene and heptane and dried under a vacuum. Any excess $AlCl_3$ is then sublimed under a vacuum at 130° C.

This solid is then reacted at 50° C. with 20 ml of a solution of diethylaluminum chloride having a molar mass of 1.15 M (represented by formula $AlX_nR_{3-n}$ where n=1) in heptane. The resultant catalyst is washed three times when cold with 50 ml of heptane and dried under a vacuum.

2) Butadiene Polymerization Process:

A suspension comprising 180 ml of heptane, to which 80 mg of the above-prepared catalyst and 3 mmol/l of diisobutylaluminum hydride activator compound have been added, is introduced into a reactor. 30 ml of butadiene are then added and the reactor temperature is adjusted to 70° C. After 60 minutes' reaction time, polymerization is terminated by cooling the reactor and then by precipitating the resultant polymer in methanol.

0.46 g of polybutadiene are obtained having an intrinsic viscosity of 4.50 dl/g and a cis linkage content of slightly above 99%.

EXAMPLE 8

1) Catalyst Preparation (Preformed Complex and Final Addition of a Compound of the Formula $AlXR_{3-n}$):

30 ml of a Lewis acid comprising $TiCl_4$ are added to 1.1 g of heat-treated silica "I 332". The mixture is stirred at a temperature of 80° C. for 1 hour, then the resultant solid is washed with heptane. In this manner, a solid support for the catalyst is obtained.

0.21 g of $NdCl_3$ and 0.23 g of $AlCl_3$ are then added to 0.61 g of this support and the mixture is then stirred at 90° C. for 2 days. In this manner, an $Nd(\eta^6\text{-}C_6H_5Me)(AlCl_4)_3$ complex is formed in situ. The resultant solid is then washed with toluene and dried under a vacuum.

This solid is then reacted at room temperature for 3 hours with 5 ml of a 1.25 M triethylaluminum solution. The resultant catalyst is then washed with heptane and dried under a vacuum.

2) Butadiene Polymerization Process:

A suspension comprising 180 ml of heptane, to which 66 mg of the above-prepared catalyst and 3 mmol/l of diisobutylaluminum hydride activator compound have been added, is introduced into a reactor. 30 ml of butadiene are then added and the reactor temperature is adjusted to 70° C. After 30 minutes' reaction time, polymerization is terminated by cooling the reactor and then by precipitating the resultant polymer in methanol.

6.1 g of polybutadiene are obtained having an intrinsic viscosity of 2.25 dl/g and a cis linkage content of slightly above 99%.

EXAMPLE 9

1) Catalyst Preparation (with a Preformed Complex and Final Addition of a Compound of the Formula $AlX_nR_{3-n}$):

0.6 ml of a solution of a Lewis acid comprising $SbCl_5$ (antimony pentachloride) in heptane are added to 1.78 g of heat-treated silica "I 332". The mixture is stirred at ambient temperature for 2 hours. In this manner, a solid support for the catalyst is obtained.

Independently of the solid support, 1.55 g of $NdCl_3$ and 0.62 g of $AlCl_3$ are stirred together in toluene at a temperature of 90° C. for 3 hours. In this manner, a solution comprising an $Nd(\eta^6\text{-}C_6H_5Me)(AlCl_4)_3$ complex is obtained.

The solid support is then reacted with the complex for 4 hours at 80° C. The resultant solid is then washed with toluene and is then reacted with 14 ml of a molar solution of triethylaluminum. The catalyst obtained in this manner is then washed with heptane and dried under a vacuum.

2) Butadiene Polymerization Process:

A suspension comprising 180 ml of heptane, to which 32.5 mg of the above-prepared catalyst and 3 mmol/l of diisobutylaluminum hydride activator compound have been added, is introduced into a reactor. 30 ml of butadiene are then added and the reactor temperature is adjusted to 70° C. After 30 minutes' reaction time, polymerization is terminated by cooling the reactor and then by precipitating the resultant polymer in methanol.

4 g of polybutadiene are obtained having an intrinsic viscosity of 4.39 dl/g and a cis linkage content of slightly above 99%.

EXAMPLE 10

1) Catalyst Preparation (with a Preformed Complex and Final Addition of a Compound of the Formula $AlX_nR_{3-n}$):

A mixture of 1.47 g of heat-treated silica "I 332" and 0.67 g of $HfCl_4$ (hafnium tetrachloride) is placed in an oven. The $HfCl_4$ is sublimed under atmospheric pressure at a temperature of 300° C. In this manner, a solid support for the catalyst is obtained.

Independently of the solid support, 0.7 g of $NdCl_3$ and 1.51 g of $AlCl_3$ are stirred together in toluene at a temperature of 90° C. for 3 hours. In this manner, a solution comprising an $Nd(\eta^6\text{-}C_6H_5Me)(AlCl_4)_3$ complex is obtained.

The solid support is then reacted with the complex for 2 hours at 90° C. The resultant solid is washed with toluene and is then reacted with 19 ml of a 1.1 molar solution of triethylaluminum. The catalyst obtained in this manner is then washed with heptane and dried under a vacuum.

2) Butadiene Polymerization Process:

A suspension comprising 180 ml of heptane, to which 108.5 mg of the above-prepared catalyst and 3 mmol/l of diisobutylaluminum hydride activator compound have been added, is introduced into a reactor. 30 ml of butadiene are then added and the reactor temperature is adjusted to 70° C. After 20 minutes' reaction time, polymerization is terminated by cooling the reactor and then by precipitating the resultant polymer in methanol.

4.25 g of polybutadiene are obtained having an intrinsic viscosity of 4 dl/g and a cis linkage content of slightly above 99%.

EXAMPLE 11

1) Catalyst Preparation (with a Preformed Complex and Final Addition of a Compound of the Formula $AlX_nR_{3-n}$):

6 ml of a molar solution of a Lewis acid comprising $BCl_3$ in heptane are added to 2.69 g of heat-treated silica "AEROSIL 200" which has been placed in heptane. The mixture is stirred at a temperature of 70° C. for 1 hour, then the resultant solid is washed with heptane and dried under a vacuum. In this manner, a solid support for the catalyst is obtained.

Independently of the solid support, 0.6 g of $NdCl_3$ and 1.6 g of $AlCl_3$ are stirred together in toluene at a temperature of 90° C. for 3 hours. In this manner, a solution comprising an $Nd(\eta^6\text{-}C_6H_5Me)(AlCl_4)_3$ complex is obtained.

The solid support is then reacted with the complex for 4 hours at 80° C. The resultant solid is then washed with toluene and is then reacted with 10 ml of a molar solution of triethylaluminum. The catalyst obtained in this manner is then washed with heptane and dried under a vacuum.

2) Butadiene Polymerization Process:

A suspension comprising 180 ml of heptane, to which 68.5 mg of the above-prepared catalyst and 3 mmol/l of diisobutylaluminum hydride activator compound have been added, is introduced into a reactor. 30 ml of butadiene are then added and the reactor temperature is adjusted to 70° C. After 30 minutes' reaction time, polymerization is terminated by cooling the reactor and then by precipitating the resultant polymer in methanol.

0.40 g of polybutadiene are obtained having an intrinsic viscosity of 4 dl/g and a cis linkage content of slightly above 99%.

EXAMPLE 12

1) Catalyst Preparation (with a Preformed Complex and Final Addition of a Compound of the Formula $AlX_nR_{3-n}$):

7.9 ml of a molar solution of a Lewis acid comprising $BCl_3$ in heptane are added to 1.23 g of heat-treated silica "I 332" which has been placed in heptane. The mixture is stirred at a temperature of 70° C. for 1 hour, then the resultant solid is washed with heptane and dried under a vacuum. In this manner, a solid support for the catalyst is obtained.

Independently of the solid support, 0.42 g of $PrCl_3$ (praseodymium trichloride) and 1.58 g of $AlCl_3$ are stirred together in toluene at a temperature of 90° C. for 90 minutes. In this manner, a solution comprising a $Pr(\eta^6\text{-}C_6H_5Me)(AlCl_4)_3$ complex is obtained.

The solid support is then reacted with the complex for 90 minutes at 90° C. The resultant solid is then washed with toluene and is then reacted with 8.2 ml of a 1.15 molar solution of triethylaluminum. The catalyst obtained in this manner is then washed with heptane and dried under a vacuum.

2) Butadiene Polymerization Process:

A suspension comprising 180 ml of heptane, to which 68.5 mg of the above-prepared catalyst and 3 mmol/l of diisobutylaluminum hydride activator compound have been added, is introduced into a reactor. 30 ml of butadiene are then added and the reactor temperature is adjusted to 70° C. After 30 minutes' reaction time, polymerization is terminated by cooling the reactor and then by precipitating the resultant polymer in methanol.

2.54 g of polybutadiene are obtained having an intrinsic viscosity of 3 dl/g and a cis linkage content of 98%.

These Examples demonstrate that a solid supported catalyst according to the invention allows the production of highly cis-stereospecific diene polymers.

It will be noted that a catalyst according to the invention exhibits the advantage of not requiring prior synthesis of an organic rare earth derivative, such as a carboxylate, in order to solubilize the rare earth, with a satisfactory level of dispersion in a hydrocarbon solvent.

It will moreover be noted that the solid supported catalyst according to the invention exhibits the advantage of exhibiting elevated and stable activity, irrespective of the quantity of compound of the formula $AlX_nR_{3-n}$, used for the preparation thereof. For example, satisfactory catalyst activity may be achieved when a considerable excess of trialkylaluminum is used as the compound $AlX_nR_{3-n}$.

What is claimed is:

1. A solid supported catalyst for the polymerization of conjugated dienes, comprising a reaction product of
    a. a complex represented by formula $M(Ar)(AlX_4)_3$, where M is selected from the group consisting of lanthanum, cerium, praseodymium, neodymium, promethium, samarium, europium, gadolinium, terbium, dysprosium, holmium, erbium, thulium, ytterbium, and lutetium, Ar is an aromatic hydrocarbon solvent, Al is aluminum and X is selected from the group consisting of fluorine, chlorine, bromine and iodine, and
    b. a solid support comprising an inorganic metal oxide compound.

2. The solid supported catalyst according to claim 1, wherein the solid support comprises silica.

3. The solid supported catalyst according to claim 1 or 2, further comprising a compound represented by formula $AlX_nR_{3-n}$, where Al is an aluminum atom, X is selected from the group consisting of fluorine, chlorine, bromine and iodine, R is a hydrogen atom or an alkyl group having from 1 to 15 carbon atoms and n is an integer ranging from 0 to 3.

4. The solid supported catalyst according to claim 3, wherein $AlX_nR_{3-n}$ is triethylaluminum, triisobutylaluminum or diethylaluminum chloride.

5. The solid supported catalyst according to claim 1 wherein M is neodymium.

6. The solid supported catalyst according to claim 1 wherein X is chlorine.

7. The solid supported catalyst according to claim 1 wherein the solid support comprises the reaction product of an inorganic metal oxide compound with a Lewis acid of the formula $M'X_n$, where n is an integer ranging from 3 to 5, X is selected from the group consisting of fluorine, chlorine, bromine and iodine and M' is selected from the group consisting of boron, aluminum, titanium, iron, zirconium, tin, antimony, hafnium, lanthanum, cerium, praseodymium, neodymium, promethium, samarium, europium, gadolinium, terbium, dysprosium, holmium, erbium, thulium, ytterbium, and lutetium.

8. The solid supported catalyst according to claim 7 wherein M' is selected from the group consisting of boron, titanium, iron, aluminum, zirconium, tin, hafnium and antimony.

9. A process for the preparation of a solid supported catalyst comprising the reaction product of
    a. a complex represented by formula $M(Ar)(AlX_4)_3$, where M is selected from the group consisting of lanthanum, cerium, praseodymium, neodymium, promethium, samarium, europium, gadolinium, terbium, dysprosium, holmium, erbium, thulium, ytterbium, and lutetium, Ar is an aromatic hydrocarbon solvent and X is selected from the group consisting of fluorine, chlorine, bromine and iodine, and b. a solid support comprising an inorganic metal oxide compound, said process comprising (i) preparing said solid support, (ii) preparing said complex of formula $M(Ar)AlX_4)_3$ by reacting, in solvent Ar, a halide of metal M, represented by the formula $MX_3$, and a halide of aluminum, represented by the formula $AlX_3$, wherein $MX_3$ and $AlX_3$ contain the same halogen X, and (iii) reacting said complex with said solid support to obtain said catalyst.

10. The process according to claim 9, wherein the molar ratio $AlX_3:MX_3$ is greater than or equal to 3.

11. The process according to claim 10, wherein the molar ratio is between 4 and 7.

12. A process for the preparation of a solid supported catalyst, comprising the reaction product of a. a complex represented by formula $M(Ar)(AlX_4)_3$, where M is selected from the group consisting of lanthanum, cerium, praseodymium, neodymium, promethium, samarium, europium, gadolinium, terbium, dysprosium, holmium, erbium, thulium, ytterbium, and lutetium, Ar is an aromatic hydrocarbon solvent and X is selected from the group consisting of fluorine, chlorine, bromine and iodine, and b. a solid support comprising an inorganic metal oxide compound, said process comprising (i) reacting the solid support in the aromatic hydrocarbon solvent Ar with an excess of an aluminum halide represented by formula $AlX_3$ and (ii) reacting the product of (i) with a halide of the metal represented by the formula $MX_3$, wherein $AlX_3$ and $Mx_3$ contain the same halogen X, in order to form the catalyst comprising complex $M(Ar)(AlX_4)_3$.

13. A process for the preparation of a solid supported catalyst comprising the reaction product of a. a complex represented by formula $M(Ar)(AlX_4)_3$, where M is selected from the group consisting of lanthanum, cerium, praseodymium, neodymium, promethium, samarium, europium, gadolinium, terbium, dysprosium, holmium, erbium, thulium, ytterbium, and lutetium, Ar is an aromatic hydrocarbon solvent and X is selected from the group consisting of fluorine, chlorine, bromine and iodine, and b. a solid support comprising an inorganic metal oxide compound, said process comprising concomitantly reacting, in the aromatic hydrocarbon solvent Ar, said solid support with an excess of aluminum halide $AlX_3$, and a metal halide of a metal represented by the formula $MX_3$, wherein $AlX_3$ and $MX_3$ contain the same halogen X, in order to form the catalyst comprising complex $M(Ar)(AlX_4)_3$.

14. The process according to any of claims 9 to 13, further comprising reacting said catalyst with a compound represented by formula $AlX_nR_{3-n}$, where Al is an aluminum atom, X is selected from the group consisting of fluorine, chlorine, bromine and iodine, R is a hydrogen atom or an alkyl group having from 1 to 15 carbon atoms and n is an integer ranging from 0 to 3, inclusive.

15. The process according to claim 14, wherein $AlX_nR_{3-n}$ is triethylaluminum, triisobutylaluminum or diethylaluminum chloride.

16. The process according to any of claims 9, 12 or 13, further comprising dehydrating said inorganic metal oxide compound and then partially dehydroxylating said compound by heat treatment at a temperature of between 300° C. and 800° C.

17. The process according to any of claim 9, 12 or 13, wherein the solid support comprises the reaction product of an inorganic metal oxide compound with a Lewis acid of the formula $M'X_n$, where n is an integer ranging from 3 to 5, inclusive, X is selected from the group consisting of fluorine, chlorine, bromine and iodine and M' is selected from the group consisting of boron, aluminum, titanium, iron, zirconium, tin, antimony, hafnium, lanthanum, cerium, praseodymium, neodymium, promethium, samarium, europium, gadolinium, terbium, dysprosium, holmium, erbium, thulium, ytterbium, and lutetium.

18. The process according to claim 17, wherein said M' is selected from the group consisting of boron, titanium, iron, aluminum, zirconium, tin, hafnium and antimony.

19. The process according to claim 17, further comprising reacting said Lewis acid of formula $M'X_n$ in the solid state and in excess with said inorganic metal oxide compound and subliming said acid.

20. The process according to claim 17, wherein said Lewis acid of formula M'Xn is reacted in solution in an inert hydrocarbon solvent with said inorganic metal oxide compound.

21. The solid supported catalyst according to claim 3 wherein X in the formula $AlX_nR_{3-n}$ is chlorine.

* * * * *